United States Patent [19]

Onishi et al.

[11] Patent Number: 4,973,644

[45] Date of Patent: Nov. 27, 1990

[54] ROOM TEMPERATURE-CURABLE ORGANOPOLYSILOXANE COMPOSITION

[75] Inventors: Masayuki Onishi; Miyoji Fukayama, both of Chiba, Japan

[73] Assignee: Toray Silicone Company, Ltd., Tokyo, Japan

[21] Appl. No.: 358,749

[22] Filed: May 30, 1989

[30] Foreign Application Priority Data

Jun. 2, 1988 [JP] Japan .................. 63-136075

[51] Int. Cl.$^5$ ............................. C08G 77/06
[52] U.S. Cl. ........................ 528/15; 528/17; 528/18; 528/19; 528/30; 528/33; 528/34
[58] Field of Search ................ 528/30, 33, 34, 17, 528/18, 15, 19

[56] References Cited

U.S. PATENT DOCUMENTS

| | | | |
|---|---|---|---|
| 4,483,973 | 11/1984 | Lucas et al. | 528/34 |
| 4,487,907 | 12/1984 | Fukayama et al. | 528/32 |
| 4,546,018 | 10/1985 | Ryuzo et al. | 428/447 |

FOREIGN PATENT DOCUMENTS 166344  8/1985  Japan .

Primary Examiner—Melvyn I. Marquis
Attorney, Agent, or Firm—Roger H. Borrousch

[57] ABSTRACT

Room temperature-curable compositions made from an organopolysiloxane having at least two silicon-bonded alkoxy groups per molecule, an alkoxysilane having three or four alkoxy groups per molecule, a mercapto group-containing alkoxysilane, and a curing catalyst produce cured materials under sealed storage stability, reversion resistance.

3 Claims, No Drawings

ROOM TEMPERATURE-CURABLE ORGANOPOLYSILOXANE COMPOSITION

BACKGROUND OF THE INVENTION

1. Technical Field

The present invention relates to a room temperature-curable organopolysiloxane composition, and, more particularly, relates to a room temperature-curable organopolysiloxane composition which evidences an excellent adhesion for various and diverse substrates while having an excellent storage stability under seal.

2. Prior Art and Problem Therein

Various types of room temperature-curable organopolysiloxane compositions which cure to the elastomer at room temperature upon contact with atmospheric moisture are already familiar to the art. Above all, because they are not accompanied by disagreeable odors and do not corrode metal with which they may be in contact, those types which cure with the release of alcohol are used as sealants, adhesives, and coatings for electrical and electronic devices and instruments. However, this type of room temperature-curable organopolysiloxane composition suffers from the problem of a poor adhesion for various substrates, such as glasses, metals, plastics, etc.

SUMMARY OF THE INVENTION

Problem to Be Solved by the Invention

The present inventors achieved the invention under consideration as the result of extensive research directed at a solution to the aforementioned problem.

The invention takes as its object the introduction of a room temperature-curable organopolysiloxane composition which has both an excellent adhesiveness for various and diverse substrates as well as an excellent storage stability under seal.

Means Solving the Problem and Function Thereof

The present invention relates to a room temperature-curable organopolysiloxane composition comprising (A) 100 weight parts organopolysiloxane having at least 2 silicon-bonded alkoxy groups in each molecule and having a viscosity of 20 to 1,000,000 centipoise at 25° C., (B) 0.5 to 15 weight parts organosilane represented by the general formula

wherein $R^1$ is a monovalent hydrocarbon group, $R^2$ is a monovalent hydrocarbon group or alkoxy-substituted hydrocarbon group, and a is zero or one, or a partial hydrolysis condensate thereof, (C) 0.01 to 15 weight parts mercapto group-containing alkoxysilane represented by the general formula

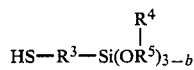

wherein $R^3$ is a divalent organic group, $R^4$ and $R^5$ are substituted or unsubstituted monovalent hydrocarbon groups, and b is zero or one, or partial hydrolysis condensate thereof, and (D) 0.01 to 10 weight parts curing catalyst.

DETAILED DESCRIPTION OF THE PREFERRED EMBODIMENTS

Considering the preceding in greater detail, the component (A) used by the present invention is the base or principal material of the composition under consideration, and it is essential that it contain at least two silicon-bonded alkoxy groups in each molecule in order to obtain an excellent storage stability. Preferred among such components (A) are straight-chain organopolysiloxanes having the silicon-bonded alkoxy group at the molecular terminals as represented by the general structure

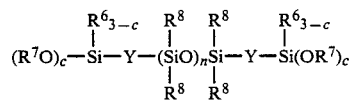

wherein $R^6$ is a monovalent hydrocarbon group; $R^7$ is a monovalent hydrocarbon group or alkoxy-substituted hydrocarbon group; $R^8$ is a group selected from among monovalent hydrocarbon groups, halogenated hydrocarbon groups, and cyanoalkyl groups; Y is an oxygen atom or a divalent hydrocarbon group; c is one, two, or three; and n is a positive number which gives a viscosity of 20 to 1,000,000 centipoise at 25° C. Furthermore, it is also possible to use organopolysiloxane in which such a straight-chain organopolysiloxane comprises the basic structure, but which additionally contains a branched, cyclic, or network portion or moiety.

Considering the above organopolysiloxane represented by general structure (1), examples of the monovalent hydrocarbon groups are alkyl groups such as methyl, ethyl, propyl, butyl, hexyl, octyl, decyl, and octadecyl; cycloalkyl groups such as cyclopentyl and cyclohexyl; alkenyl groups such as vinyl and allyl; aryl groups such as phenyl, tolyl, and naphthyl; and aralkyl groups such as benzyl, phenylethyl, and phenylpropyl. The halogenated hydrocarbon groups are exemplified by chloromethyl, trifluoromethyl, chloropropyl, 3,3,3-trifluoropropyl, chorophenyl, dibromophenyl, tetrachlorophenyl, and difluorophenyl. Examples of cyanoalkyl groups are beta-cyanoethyl, gamma-cyanopropyl, and beta-cyanopropyl. The group $R^7$ is exemplified by alkyl groups such as methyl, ethyl, propyl, butyl, hexyl, and octyl, and by alkoxy-substituted alkyl groups such as methoxyethyl, ethoxyethyl, methoxypropyl, and methoxybutyl. It is preferred that $R^7$ and $R^8$ in each case contain 1 to 3 carbon atoms, and in fact the methyl group is particularly preferred Y is to be an oxygen atom or a divalent hydrocarbon group, and examples of divalent hydrocarbon groups in this regard are alkylene groups such as $-CH_2CH_2-$, $-CH_2CH_2CH_2-$ and $-CH_2CH(CH_3)-$.

The viscosity of component (A) at 25° C. should fall within the range of 20 to 1,000,000 cps. Good physical properties, and particularly softness and a high elongation, cannot be imparted to the cured elastomer when this value falls below 20 cps. On the other hand, at values in excess of 1,000,000 cps, the composition will have a high viscosity, and its workability during application becomes extremely poor. Accordingly, values within the range of 100 to 500,000 cps are particularly preferred.

The organopolysiloxane comprising component (A) can be prepared by various methods known to the art.

For example, when Y in the above general structure (1) is an oxygen atom, synthesis can take the form of condensation between an alkoxysilane and the corresponding silanol-terminated organopolysiloxane in the presence or absence of catalyst. Catalysts usable in this regard are amines and the metal salts of carboxylic acids such as the zinc, tin, and iron salts of carboxylic acids. When the condensation reaction is conducted in the absence of catalyst, the reaction mixture is preferably heated to the reflux temperature of the alkoxysilane. When a catalyst is used, synthesis may be carried out by running the condensation reaction within the temperature interval from room temperature to the reflux temperature of the alkoxysilane.

The molar ratio between the silanol groups in the organopolysiloxane and the alkoxy groups in the alkoxysilane in this condensation reaction should be at least 1 and preferably falls within the range of 5 to 15.

Other condensation reaction methods for the preparation of the organopolysiloxane of component (A) comprise, for example, the reaction of the corresponding silanol-terminated organopolysiloxane and chlorosilane represented by the formula $$R^1{}_m SiCl(OR^2)_{3-m}$$

wherein $R^1$ and $R^2$ are defined as above, and m is zero, one, or two in the presence of a hydrogen halide binder such as pyridine, alpha-picoline, or other tertiary amines, as well as the condensation reaction between organopolysiloxane having silicon-bonded halogen at the molecular chain terminals and monovalent alcohol represent by the formula $R^2OH$ ($R^2$ is defined as above) in the presence of a hydrogen halide binder as above.

When Y in the above general structure (1) is an alkylene group, component (A) can be prepared by the addition reaction, in the presence of a platinum catalYst, of the corresponding alkenyl-terminated organopolysiloxane and alkoxysilane represented by the formula $$\begin{array}{c} R^6{}_{3-c} \\ | \\ H-Si(OR^7)_c \end{array}$$

wherein $R^6$, $R^7$, and c are defined as above, or by the addition reaction of the corresponding SiH-terminated organopolysiloxane and $$\begin{array}{c} R^6{}_{3-c} \\ | \\ R^9-Si(OR^7)_c \end{array}$$

wherein $R^9$ is an alkenyl group and $R^6$, $R^7$, and c are defined as above.

Component (B) used by the present invention is a crosslinker for the composition of the invention under consideration, and it is the essential component for converting the composition of the present invention into a rubbery elastic substance by curing. This component comprises organosilane represented by the general formula $$R^1{}_a Si(OR^2)_{4-a}$$

wherein $R^1$ is a monovalent hydrocarbon group, $R^2$ is a monovalent hydrocarbon group or alkoxy-substituted hydrocarbon group, and a is zero or one, with the monovalent hydrocarbon groups and alkoxy-substituted hydrocarbon groups being exemplified as above or partial hydrolysis condensate thereof.

Examples of component (B) are as follows: tetrafunctional alkoxysilanes such as
tetramethoxysilane,
tetraethoxysilane, and
methyl Cellosolve orthosilicate;
trifunctional alkoxysilanes such as
methyltrimethoxysilane,
methyltriethoxysilane,
ethyltrimethoxysilane,
vinyltrimethoxysilane,
phenyltrimethoxysilane, and
methyltrimethoxyethoxysilane;
alkenyloxysilanes such as
methyltrivinyloxysilane,
methyltri(isopropenyloxy)silane,
vinyltri(isopropenyloxy)silane,
phenyltri(isopropenyloxy)silane, and
tetra(isopropenyloxy)silane; and
their partial hydrolysis condensates. These may be used individually, but it is also allowable to use mixtures of two or more species. Furthermore, the supplementary addition of difunctional alkoxysilane, such as diphenyldimethoxysilane, dimethyldimethoxysilane, etc., is permissible for the purpose of equipping the cured rubbery elastomer with a low modulus.

The quantity of addition of component (B) should fall within the range of 0.5 to 15 weight parts and preferably falls within the range of 1 to 10 weight parts per 100 weight parts component (A). When this quantity of addition is too low, the composition of the present invention will not adequately cure, and during storage will suffer from an increase in viscosity and will readily gel. An excessive addition leads to slow curing and is uneconomical.

The mercapto group-containing alkoxysilane (or partial hydrolysis condensate thereof) comprising component (C) used in the present invention is the crucial component for providing adhesion to various types of substrates.

$R^3$ in the general formula given above is a divalent organic group, and examples in this regard are methylene, ethylene, propylene, butylene, chloroethylene, fluoroethylene, phenylene, $$-CH_2OCH_2CH_2CH_2-,$$

$$-CH_2CH_2OCH_2CH_2-,$$

$$-CH_2OCH(CH_3)CH_2-,$$

$$-CH_2OCH_2CH_2OCH_2CH_2-, \text{ and}$$

divalent organic groups comprising combinations of two or more of the preceding groups. $R^4$ and $R^5$ are substituted or unsubstituted monovalent hydrocarbon groups, and examples in this case are methyl, ethyl, propyl, octyl, phenyl, vinyl, and 3,3,3-trifluoropropyl. Alkyl and alkoxyalkyl are particularly preferred among these.

Examples of the mercapto group-containing alkoxysilanes under consideration are as follows:
gamma-mercaptopropyltrimethoxysilane,
gamma-mercaptopropylmethyldimethoxysilane,
gamma-mercaptopropyltriethoxysilane,
gamma-mercaptobutyltrimethoxysilane,
gamma-mercaptobutyltris(methoxyethoxy)silane, HSCH$_2$CH$_2$O(CH$_2$)$_3$Si(OCH$_3$)$_3$,

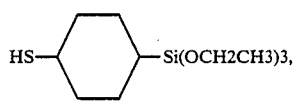

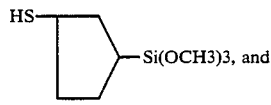

HSCH$_2$COCH$_2$CH$_2$CH$_2$Si(OCH$_3$)$_3$.
       ‖
       O

The addition of component (C) should fall within the range of 0.01 to 15 weight parts and preferably 0.05 to 10 weight parts per 100 weight parts component (A). When too little is added, adhesion to the substrate becomes inadequate from the standpoint of practical applications. On the other hand, an excessive addition is economically disadvantageous.

Component (D) is a catalyst which promotes the curing reaction of the composition of the present invention. Operable curing catalysts are the tin, titanium, zirconium, iron, antimony, bismuth, and manganese salts of organic acids, as well as organotitanate esters and organotitanium chelate compounds. Concrete examples of useful curing catalysts are tin compounds such as dibutyltin dilaurate, dibutyltin dioctoate, stannous octoate, etc., and titanium compounds such as tetrabutyl titanate, tetraisopropyl titanate, diisopropoxybis(acetylacetone)titanium, diisopropoxybis(ethyl acetoacetate)titanium, etc. The preferred quantity of addition for this component is 0.1 to 5 weight parts per 100 weight parts component (A).

The composition of the present invention, in addition to the preceding components (A) through (C), can also optionally contain microparticulate inorganic filler in order to improve the physical properties of the cured product and improve the flow properties prior to curing. Here, the quantity of addition should fall within the range of 1 to 200 weight parts and preferably 5 to 100 weight parts per 100 weight parts component (A). Examples of such inorganic fillers are dry-method silicas, wet-method silicas, quartz powder, calcium carbonate, titanium dioxide, diatomaceous earth, aluminum hydroxide, and microparticulate alumina, magnesia, zinc oxide, and zinc carbonate, as well as the preceding after surface treatment with, for example, silane, silazane, polysiloxane with a low degree of polymerization, or organic compounds.

In addition, as long as the object of the present invention is not compromised, there is no impediment to the addition of the following to the composition of the present invention: organic solvents, diorganopolysiloxane with trimethylsilylated molecular chain terminals, flame retardants, plasticizers, thixotropic agents, general adhesion promoters, antimolds, etc.

The composition of the present invention is obtained by mixing components (A) through (C) and the various optional additives while excluding moisture. The obtained composition is then stored as such in a sealed container, and cures to give a rubbery elastic substance upon exposure to atmospheric moisture when applied. It can be used as a so-called single-package room temperature-curable organopolysiloxane composition.

The present invention will be explained in greater detail through the following illustrative examples. In the examples, comparison examples, and reference examples, parts=weight parts in all cases and the viscosity is the value at 25 degrees Centigrade.

EXAMPLE 1

100 Parts alpha,omega-bis(trimethoxysilyl)dimethylpoly siloxane with a viscosity of 15,000 centipoise and 12 parts dry-method silica (surface treated with hexamethyldisilazane, specific surface area=110 m$^2$/g by the BET method) were mixed at room temperature for 30 minutes. This was then further mixed at 40 mmHg while heating to 180° C. until homogeneous. In order to prepare the room temperature-curable organopolysiloxane compositions reported in Table 1, the following were then mixed to homogeneity into the obtained mixture while excluding moisture: 5 parts methyltrimethoxysilane, 1.5 parts diisopropoxybis(ethyl acetoacetate)titanium, and 0.5 parts gamma-mercaptopropyltrimethoxysilane or 0.5 parts gamma-mercaptopropylmethyldimethoxysilane. The products were then placed in aluminum tubes and stored under seal.

The adhesion of these room temperature-curable organopolysiloxane compositions to various substrates was then measured, and the measurement results are reported in Table 2. Adhesion testing was conducted as follows. The room temperature-curable organopolysiloxane composition as described above was extruded in bead-form (width 15 mm×length 40 mm×thickness 5 cm) on the particular substrate according to the tab adhesion test method, and this was cured by standing for 7 days at 20° C. and 55% RH. The obtained cured bead was pulled in order to separate it from the substrate surface, and the resulting peel surface was examined The proportion of rupture in the cured layer is reported as the % cohesive rupture.

For comparison, a room temperature-curable organopolysiloxane composition was prepared as above with the exception that the aforementioned mercapto group-containing alkoxysilane was not used. The result of adhesion measurement on this composition were as reported in Table 2.

TABLE 1

| COMPONENTS | PRESENT INVENTION | COMPARISON EXAMPLE |
|---|---|---|
| Alpha, omega-bis(trimethoxysilyl-dimethylpolysiloxane, parts | 100 | 100 |
| Hexamethyldisilazane-treated silica, parts | 12 | 12 |
| Methyltrimethoxysilane, parts | 5 | 5 |
| Diisopropoxybis(ethyl-acetoacetate)titanium, parts | 1.5 | 1.5 |
| Gamma-mercaptopropyl-trimethoxysilane, parts | 0.5 | 0 |

EXAMPLE 2

Room temperature-curable organopolysiloxane composition prepared as in Example 1 was extruded from an aluminum tube into a metal mold for sheet molding. A 2.5 mm-thick sheet was prepared by curing by standing for 7 days at 20° C. and 55% RH. The physical properties of this sheet were then measured according to JIS K 6301. In addition, the aforementioned aluminum tube was placed in an oven maintained at 50° C., and thermal aging was carried out by allowing this to stand as such for 4 weeks. The physical properties of the thermally aged room temperature-curable organopolysiloxane composition were then measured as above. The various measurement results were as reported in Table 3.

For comparison, a room temperature-curable organopolysiloxane composition was prepared as in Example 1 with the modification that an alpha,omega-bis(dihydroxy)dimethylpolysiloxane with a viscosity of 15,000 centipoise was used in place of the alpha,omega-bis(trimethoxysilyl)dimethylpolysiloxane with a viscosity of 15 000 centipoise of Example 1. The physical properties of this composition were measured as described above, and these results were as reported in Table 3.

TABLE 3

| PHYSICAL PROPERTIES | PRESENT INVENTION | COMPARISON EXAMPLE |
|---|---|---|
| Prior to heat aging | | |
| Hardness (JIS A) | 34 | 18 |
| Tensile strength, (kg/cm2) | 31 | 12 |
| Elongation, (%) | 430 | 350 |
| After heat aging | | |
| Hardness (JIS A) | 33 | measurements could not be conducted due to poor curing |
| Tensile strength, (kg/cm2) | 30 | |
| Elongation, (%) | 420 | |

EXAMPLE 3

A room temperature-curable organopolysiloxane composition was prepared as in Example 1 with the exception that gamma-mercaptopropylmethyldimethoxysilane was used in place of the gamma-mercaptopropyltrimethoxysilane of Example 1. The adhesion or bonding of this room temperature-curable organopolysiloxane composition for various substrates was measured as in Example 1, and these results were as reported in Table 4.

TABLE 4

| SUBSTRATE | ADHESION (% cohesive rupture) |
|---|---|
| Aluminum | 70 |
| Copper | 100 |
| Glass | 100 |
| Epoxy resin | 90 |
| Polycarbonate resin | 70 |

EXAMPLE 4

Room temperature-curable organopolysiloxane compositions as reported in Table 5 were prepared by the same procedures as in Example 1 and Example 2 with the exception that 100 parts calcium carbonate (average particle diameter=2.2 microns) was used in place of the hexamethyldisilazane-treated silica of Example 1. For comparison, a room temperature-curable organopolysiloxane composition was similarly prepared as reported in Table 5 with the exception that mercapto group-containing silane, component (C) above, was not added. These compositions were subjected to adhesion testing as in Example 1, and these results were as reported in Table 6.

TABLE 5

| COMPONENTS | PRESENT INVENTION | COMPARISON EXAMPLE |
|---|---|---|
| Alpha, omega-bis(trimethoxysilyl)-dimethylpolysiloxane, parts | 100 | 100 | 100 |
| Calcium carbonate, parts (average particle diameter = 2.2 microns) | 100 | 100 | 100 |
| Methyltrimethoxysilane, parts | 5 | 5 | 5 |
| Diisopropoxybis(ethylacetoacetate)titanium, parts | 1.5 | 1.5 | 1.5 |
| Gamma-mercaptopropyl-trimethoxysilane, parts | 0.5 | — | — |
| Gamma-mercaptopropyl-methyldimethoxysilane, parts | — | 0.5 | — |

TABLE 6

| SUBSTRATE | PRESENT INVENTION | COMPARISON EXAMPLE |
|---|---|---|
| Aluminum | 100% | 60% |
| Copper | 100% | 60% |
| Glass | 100% | 60% |
| Epoxy resin | 60% | 0% |
| Polycarbonate resin | 80% | 0% |

EXAMPLE 5

100 Parts alpha,omega-bis(methyldimethoxysilyl)-dimethyl polysiloxane with a viscosity of 13,000 centipoise and 11 parts dry-method silica with a specific surface area of 200 m²/g (BET) were mixed for 30 minutes at room temperature, followed by additional mixing at 40 mmHg to homogeneity. A room temperature-curable organopolysiloxane composition was prepared by mixing the following into this mixture to homogeneity while excluding moisture: 4 parts vinyltrimethoxysilane, 1.5 parts tetrabutyl titanate, and 0.5 parts gamma-mercaptomethyltrimethoxysilane. This composition was then subjected to adhesion testing as in Example 1, and these results were as reported in Table 7.

For comparison, a room temperature-curable organopolysiloxane composition was prepared as above with the exception that the 0.5 parts gamma-mercaptopropyltrimethoxysilane was not added. This was also subjected to adhesion testing, and these results were a reported in Table 7.

TABLE 7

| SUBSTRATE | PRESENT INVENTION | COMPARISON EXAMPLE |
|---|---|---|
| Aluminum | 100% | 50% |
| Copper | 100% | 0% |
| Glass | 100% | 50% |
| Epoxy resin | 100% | 30% |
| Polycarbonate resin | 50% | 0% |

Effects of the Invention

Because the room temperature-curable organopolysiloxane composition of the present invention comprises components (A) through (C), and particularly because it contains the organopolysiloxane comprising component (A) and the mercapto group-containing silane or partial hydrolysis condensate thereof comprising component (C), it is characterized by an excellent adhesion or bonding for various substrates and by an excellent storage stability under seal.

Accordingly, it can be used as a construction sealant; as a sealant, adhesive, or anti-moisture coating for elec- That which is claimed is:

1. A room temperature-curable organopolysiloxane composition comprising
  (A) 100 weight parts organopolysiloxane having at least 2 silicon-bonded alkoxy groups in each molecule, and the organopolysiloxane being represented by the general structure

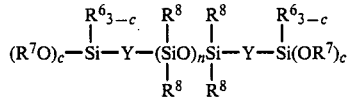

wherein $R^6$ is a monovalent hydrocarbon group; $R^7$ is a monovalent hydrocarbon group or alkoxy-substituted hydrocarbon group; $R^8$ is a group selected from the group consisting of monovalent hydrocarbon groups, halogenated hydrocarbon groups, and cyanoalkyl groups; Y is an oxygen atom; c is two or three; and n is a positive number which gives a viscosity of 20 to 1,000,000 centipoise at 25° C.,
  (B) 0.5 to 15 weight parts organosilane represented by the general formula:

$$R^1{}_a Si(OR^2)_{4-a}$$

wherein $R^1$ is a monovalent hydrocarbon group, $R^2$ is a monovalent hydrocarbon group or alkoxy-substituted hydrocarbon group, and a is zero or one, or a partial hydrolysis condensate thereof,
  (C) 0.01 to 15 weight parts mercapto group-containing alkoxysilane represented by the general formula

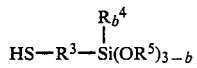

wherein $R^3$ is a divalent organic group, $R^4$ and $R^5$ are substituted or unsubstituted monovalent hydrocarbon groups, and b is zero or one, or partial hydrolysis condensate thereof; and
  (D) 0.01 to 10 weight parts curing catalyst.

2. The room temperature-curable organopolysiloxane composition according to claim 1 in which n of the organopolysiloxane of (A) is a positive number which gives a viscosity of 100 to 500,000 centipoise at 25° C.

3. The room temperature-curable organopolysiloxane composition according to claim 2 in which the mercapto group-containing alkoxysilane is gamma-mercaptopropyltrimethoxysilane or (gamma-mercaptopropyl)-methyldimethoxysilane.

* * * * *

UNITED STATES PATENT AND TRADEMARK OFFICE
CERTIFICATE OF CORRECTION

PATENT NO. : 4,973,644
DATED : November 27, 1990
INVENTOR(S) : Masayuki Onishi, and Miyoji Fukayama It is certified that error appears in the above-identified patent and that said Letters Patent is hereby corrected as shown below: Col. 6, line 60, insert Table 2 as follows:

TABLE 2

| SUBSTRATE | PRESENT INVENTION | COMPARISON EXAMPLE |
|---|---|---|
| Aluminum | 80% | 0% |
| Copper | 100% | 0% |
| Glass | 100% | 0% |
| Epoxy resin | 100% | 0% |
| Polycarbonate resin | 60% | 0% |

Signed and Sealed this

Sixteenth Day of April, 1991

Attest:

HARRY F. MANBECK, JR.

Attesting Officer

Commissioner of Patents and Trademarks